(12) United States Patent
Chang

(10) Patent No.: US 6,269,853 B1
(45) Date of Patent: Aug. 7, 2001

(54) WOOD PLANING MACHINE WITH A CARRIAGE LOCKING MECHANISM WHICH IS CONTROLLED BY A ROTARY LEVER

(75) Inventor: Chiu-Tsun Chang, Taichung (TW)

(73) Assignee: P & F Brother Industrial Corporation (CN)

( * ) Notice: Subject to any disclaimer, the term of this patent is extended or adjusted under 35 U.S.C. 154(b) by 0 days.

(21) Appl. No.: 09/669,938

(22) Filed: Sep. 26, 2000

(51) Int. Cl.$^7$ ........................................................ B27C 1/00
(52) U.S. Cl. ........................... 144/117.1; 74/491; 74/503; 144/130; 144/114.1; 403/374.2; 403/374.5; 403/309; 403/310; 403/110
(58) Field of Search ............................... 144/114.1, 112.1, 144/129, 130; 403/343, 341, 374.1, 374.2, 374.5, 409.1, 309, 310, 311, 110, 202, 234, 237, 300; 74/491, 503

(56) References Cited

U.S. PATENT DOCUMENTS

| | | | |
|---|---|---|---|
| 4,979,724 | * 12/1990 | Williams | 409/374.5 |
| 5,829,499 | * 11/1998 | Liao | 144/117.1 |
| 6,085,812 | * 7/2000 | Chiang | 144/117.1 |
| 6,089,287 | * 7/2000 | Welsh | 144/117.1 |

* cited by examiner

*Primary Examiner*—W. Donald Bray
(74) *Attorney, Agent, or Firm*—Trop, Pruner & Hu, P.C.

(57) ABSTRACT

A planing machine includes a carriage locking mechanism disposed above a cutter carriage, which in turn, is connected movably to left and right pairs of vertical posts. The carriage locking mechanism includes an elongated mounting plate disposed fixedly on the cutter carriage, a left locking unit having a pair of left clamping claws that press respectively and releaseably against the left pair of posts, and a right locking unit having a pair of right clamping claws that press releaseably against the right pair of posts. A cam member is disposed pivotally on the mounting plate. The cam member has two projections that engage respectively the left and right locking units. A pivot end of a rotary lever is mounted pivotally on the mounting plate, and is connected to the cam member so as to rotate synchronously with the cam member. The rotary lever is rotatable so as to remove the projections of the cam member from the left and right locking units. Left and right biasing units bias the left and right clamping claws to separate from the posts, respectively, when the projections of the cam member are removed from the left and right locking units.

12 Claims, 8 Drawing Sheets

WOOD PLANING MACHINE WITH A CARRIAGE LOCKING MECHANISM WHICH IS CONTROLLED BY A ROTARY LEVER

BACKGROUND OF THE INVENTION

1. Field of the Invention

The invention relates to a wood planing machine, more particularly to a wood planing machine which is provided with a carriage locking mechanism for releasably locking a cutter carriage thereof.

2. Description of the Related Art

Referring to FIGS. 1 and 2, a conventional wood planing machine is shown to include a machine base 10, left and right pairs of posts 11, a cutter carriage 12, and a carriage locking mechanism.

As illustrated, the machine base 10 has opposite mounting sides 100 spaced apart from each other in a longitudinal direction, and opposite feed-in and take-out sides spaced apart from each other in a transverse direction. The left and right pairs of posts 11 extend upward from the machine base 10 at the mounting sides 100. The cutter carriage 12 is disposed above the machine base 10, and has opposite end portions mounted movably on the posts 11 for sliding movement along the left and right pairs of posts 11. A cutter device (not shown) is mounted on the cutter carriage 12 in a known manner, and is rotatable about a horizontal axis that extends in the longitudinal direction.

Left and right threaded rods 13 are mounted rotatably on, and extend upwardly from the machine base 10 at the mounting sides 100 to pass threadedly through the opposite end portions of the cutter carriage 12. The threaded rods 13 are interconnected in such a manner to rotate synchronously. A rotary handle 14 is provided at the top end of one of the threaded rods 13 such that rotation of the latter will cause the cutter carriage 12 to slide vertically along the left and right pairs of posts 11 so as to define a gap between the cutter carriage 12 and the machine base 10 for passage of a workpiece to be processed. A top cover 17 is fixed to the left and right pairs of posts 11 above the cutter carriage 12.

The carriage locking mechanism includes a manually operable handle 16, two locking linkages 15 mounted respectively on two opposite ends of the handle 16, and four post clamps 155 (only three are shown in FIG. 1) carried on the cutter carriage 12 and associated with the posts 11, respectively. Each of the locking linkages 15 includes first and second links 151,152 connected pivotally to each other at inner ends thereof and to the handle 16, and further connected pivotally to an adjacent pair of the post clamps 155 at outer ends thereof. Each of the second links 152 consists of a front connecting rod 154 that is connected pivotally to a respective one of the first links 151, a rear sliding piece 153 that is connected movably to the front connecting rod 154 and a respective one of the post clamps 155 at two ends thereof, and a compression spring 156 that interconnects the front connecting rod 154 and the rear sliding piece 153. As such, the springs 156 bias the post clamps 155 to abut against the posts 11, respectively, when the carriage locking mechanism is at a releasing position, as shown in FIG. 2. When adjustment to a desired carriage height has been achieved, the handle 16 is operated to move downward against biasing action of the springs 156 so as to move the carriage locking mechanism from the releasing position to a locking position, where the post clamps 155 are forced to press against the posts 11, respectively. At the locking position, the first and second links 151,152 are disposed on a straight line (not shown). Thus, the carriage 12 is locked relative to the left and right pairs of posts 11 so as to retain the same at a selected height relative to the machine base 10.

One disadvantage that results from the use of the aforesaid conventional wood planing machine resides in that in order to release the cutter carriage 12 from the left and right pairs of posts 11, the handle 16 must be moved upward. In this condition, the handle 16 will prop upward swiftly by virtue of biasing action of the springs 156. As such, the hands of the operator may collide against the top cover 17, thereby possibly injuring the operator.

SUMMARY OF THE INVENTION

Therefore, the object of this invention is to provide a wood planing machine which is clear of the aforementioned drawbacks that result from the use of the conventional wood planing machine.

Accordingly, the wood planing machine of the present invention includes an elongated machine base, left and right pairs of posts, a cutter carriage, vertical left and right threaded rods, and a carriage locking mechanism. The machine base has a top surface, opposed left and right mounting sides spaced apart from each other in a longitudinal direction, and opposed feed-in and take-out sides spaced apart from each other in a transverse direction. The left and right pairs of posts are fixed on the top surface of the machine base at the left and right mounting sides, respectively. The cutter carriage is disposed above the machine base, and has opposite end portions mounted respectively, vertically and movably on the left and right pairs of posts. The left and right threaded rods are mounted respectively and rotatably on the left and right mounting sides of the machine base such that the threaded rods are disposed respectively between the left and right pairs of posts and extend threadedly through the opposite end portions of the cutter carriage for moving the cutter carriage along the posts when the threaded rods rotate on the machine base, thereby adjusting height of the cutter carriage. The carriage locking mechanism locks the cutter carriage at a selected height relative to the machine base. The carriage locking mechanism includes an elongated mounting plate, a left locking unit, a right locking unit, a cam member, a rotary lever, a left biasing unit, and a right biasing unit. The elongated mounting plate is disposed fixedly on the cutter carriage, and extends in the longitudinal direction. The left locking unit includes a pair of left clamping claws that press respectively and releaseably against two of the left pair of posts and the left threaded rod. The right locking unit includes a pair of right clamping claws that press respectively and releaseably against two of the right pair of posts and the right threaded rod. The cam member is disposed pivotally on the mounting plate, and has left and right projections that engage respectively the left and right locking units. A pivot end of the rotary lever is mounted pivotally on the mounting plate, and is connected to the cam member so as to rotate synchronously with the cam member. The rotary lever is disposed at a locking position, and is rotatable to an unlocking position so as to remove the left and right projections of the cam member from the left and right locking units. The left biasing unit biases the left clamping claws to separate from the two of the left pair of posts and the left threaded rod when the left projection of the cam member is removed from the left locking unit. The right biasing unit biases the right clamping claws to separate from the two of the right pair of posts and the right threaded rod when the right projection of the cam member is removed from the right locking unit.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
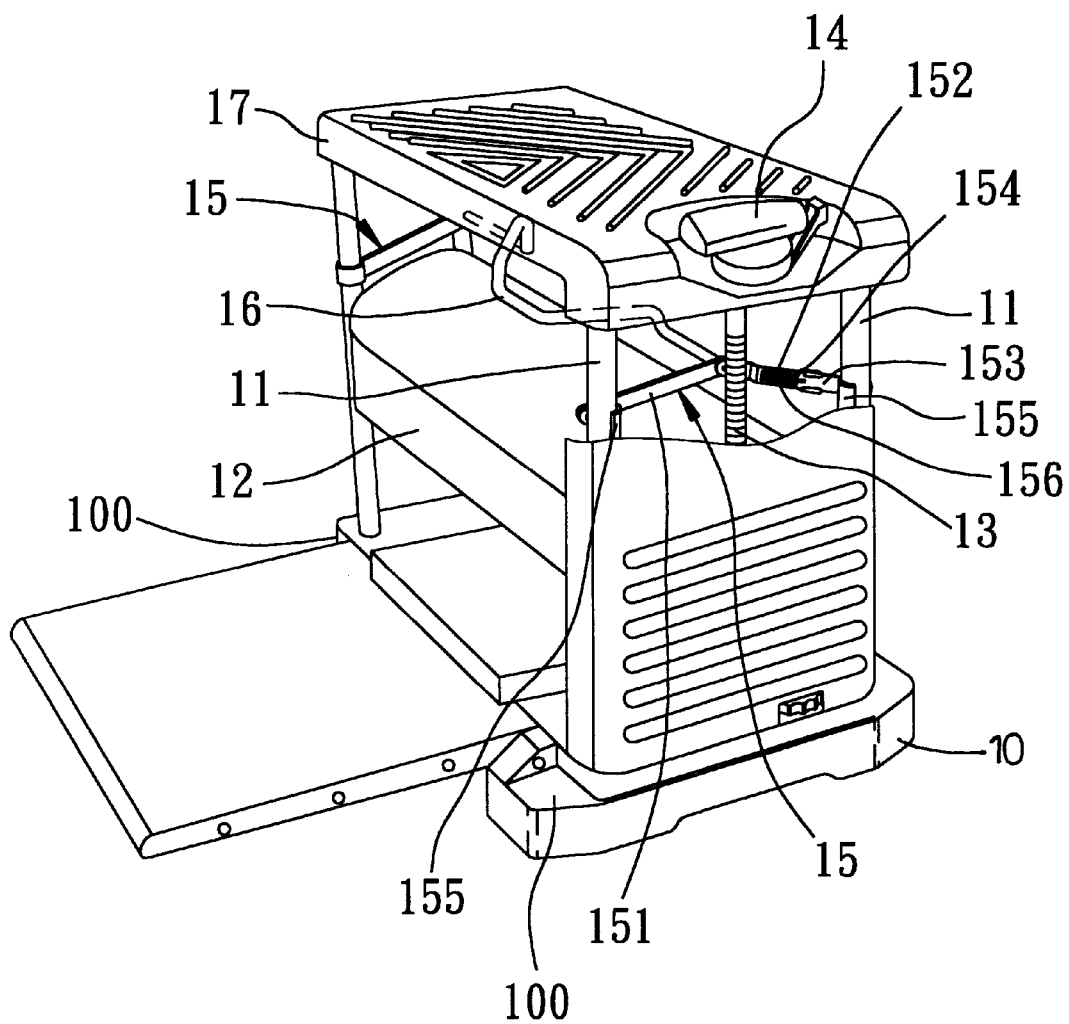
FIG. 1 is a perspective view of a conventional wood planing machine.
Figure 2:
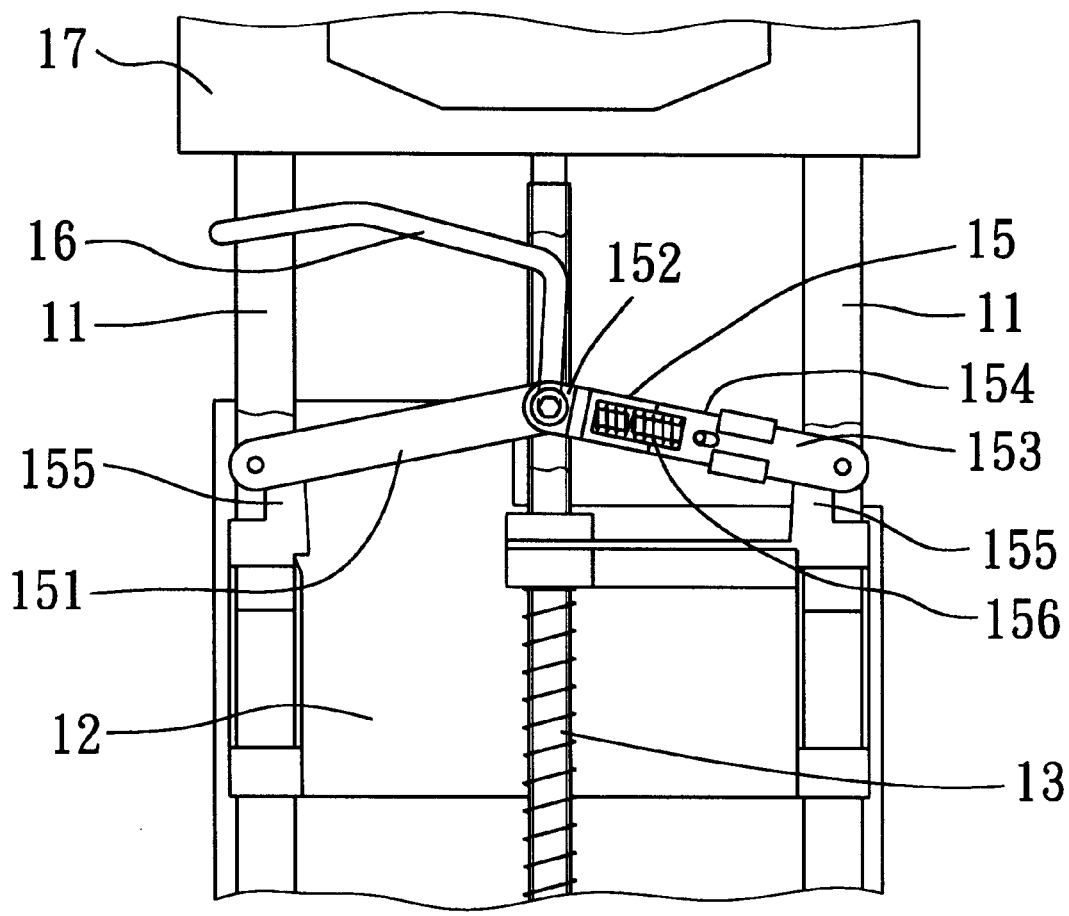
FIG. 2 is a fragmentary side view of the conventional wood planing machine of FIG. 1, illustrating carriage locking mechanism is mounted on a cutter carriage thereof.
Figure 3:
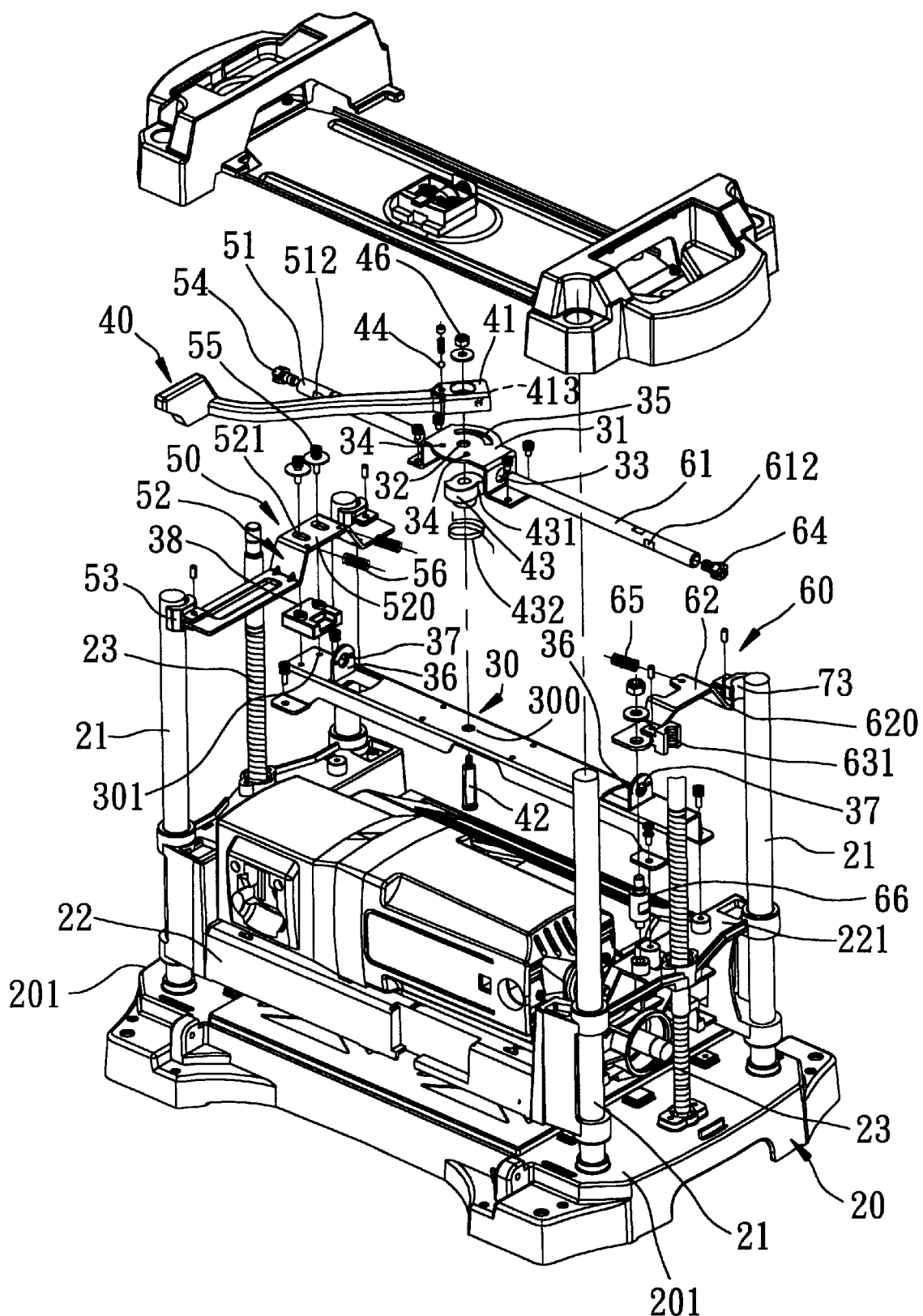
FIG. 3 is a fragmentary exploded view of a preferred embodiment of a wood planing machine according to the present invention, illustrating how a carriage locking mechanism is mounted on a cutter carriage thereof.
Figure 4:
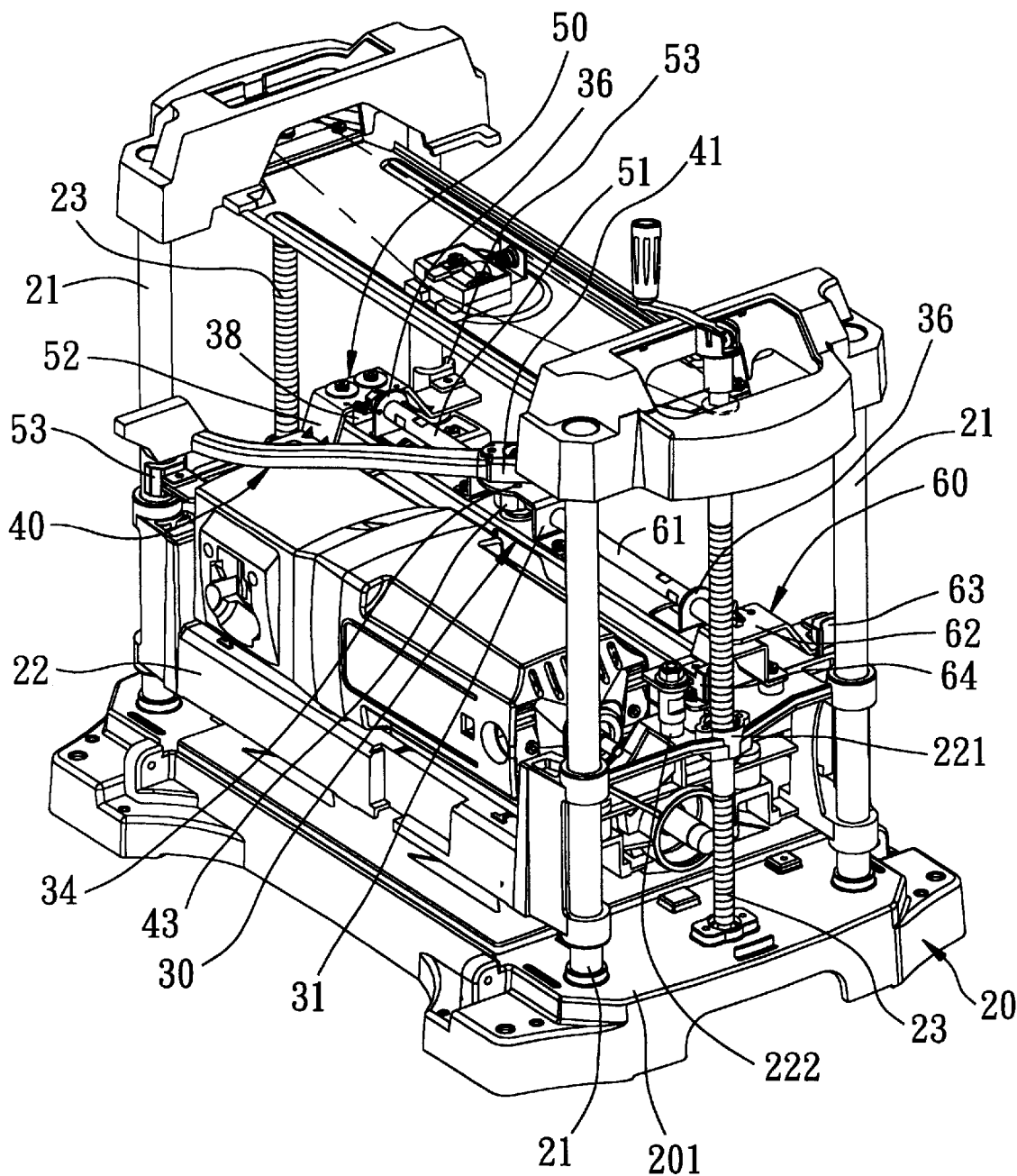
FIG. 4 is a perspective view of the preferred embodiment.
Figure 5:
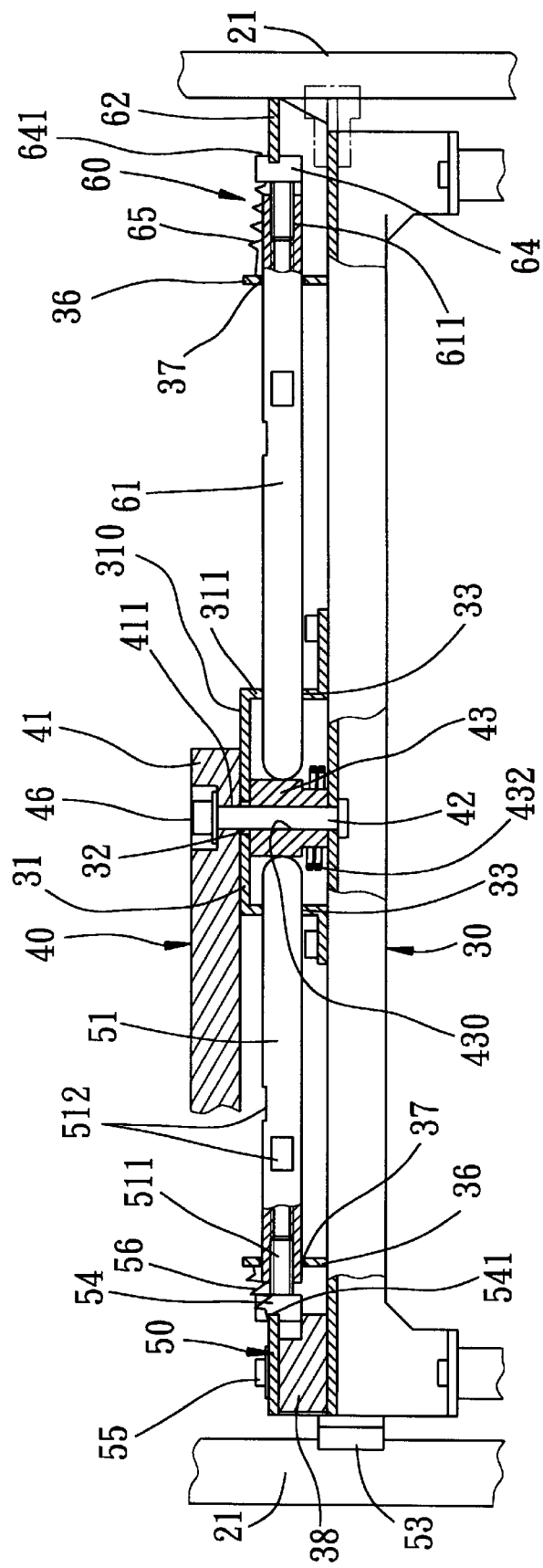
FIG. 5 is a fragmentary partly sectional, schematic side view of the preferred embodiment, illustrating how the cutter carriage is locked relative to left and right pairs of posts.

Referring to FIGS. 3, 4 and 5, the preferred embodiment of a wood planing machine of this invention is shown to include an elongated machine base 20, left and right pairs of posts 21, a cutter carriage 22, vertical left and right threaded rods 23, and a carriage locking mechanism.

As illustrated, the machine base 20 has a top surface, opposed left and right mounting sides 201 spaced apart from each other in a longitudinal direction, and opposed feed-in and take-out sides spaced apart from each other in a transverse direction.

The left and right pairs of posts 21 are fixed on the top surface of the machine base 20 at the left and right mounting sides 201, respectively.

The cutter carriage 22 is disposed above the machine base 20, and has opposite end portions 221 mounted respectively, vertically and movably on the left and right pairs of posts 21. A cutter device (not shown) is mounted rotatably on the cutter carriage 22 in the conventional manner so as to extend in the longitudinal direction. Since the structure of the cutter device is not pertinent to the present invention, a detailed description thereof will be omitted herein for the sake of brevity.

The left and right threaded rods 23 are mounted respectively and rotatably on the left and right mounting sides 201 of the machine base 20 such that the threaded rods 23 are disposed respectively between the left and right pairs of posts 21, and extend threadedly through the opposite end portions 221 of the cutter carriage 22 for moving the cutter carriage 22 along the posts 21 when the threaded rods 23 rotate on the machine base 20, thereby adjusting height of the cutter carriage 22.

The carriage locking mechanism locks the cutter carriage 22 at a selected height relative to the machine base 20, and includes an elongated mounting plate 30, a left locking unit 50, a right locking unit 60, a cam member 43, a rotary lever 40, a left biasing unit 56, and a right biasing unit 65.

The mounting plate 30 is disposed fixedly on the cutter carriage 22, and extends in the longitudinal direction.

The left locking unit 50 includes a pair of left clamping claws 53 that press respectively and releaseably against two of the left pair of posts 21 and the left threaded rod 23. In this embodiment, the left clamping claws 53 press against the left pair of posts 21.

The right locking unit 60 includes a pair of right clamping claws 63 that press respectively and releaseably against two of the right pair of posts 21 and the right threaded rod 23. In this embodiment, the right clamping claws 63 press against the right threaded rod 23 and one of the right pair of posts 21.

The cam member 43 is disposed pivotally on the mounting plate 30 and is rotatable about a vertical axis. Left and right projections 431 are formed on the cam member 43, and engage respectively the left and right locking units 50,60.

A pivot end 41 of the rotary lever 40 is mounted pivotally on the mounting plate 30, and is connected to the cam member 43 so as to rotate synchronously with the cam member 43. The rotary lever 40 is disposed at a locking position, and is rotatable about the vertical axis to an unlocking position so as to remove the left and right projections 431 of the cam member 43 from the left and right locking units 50,60.

Figure 7:
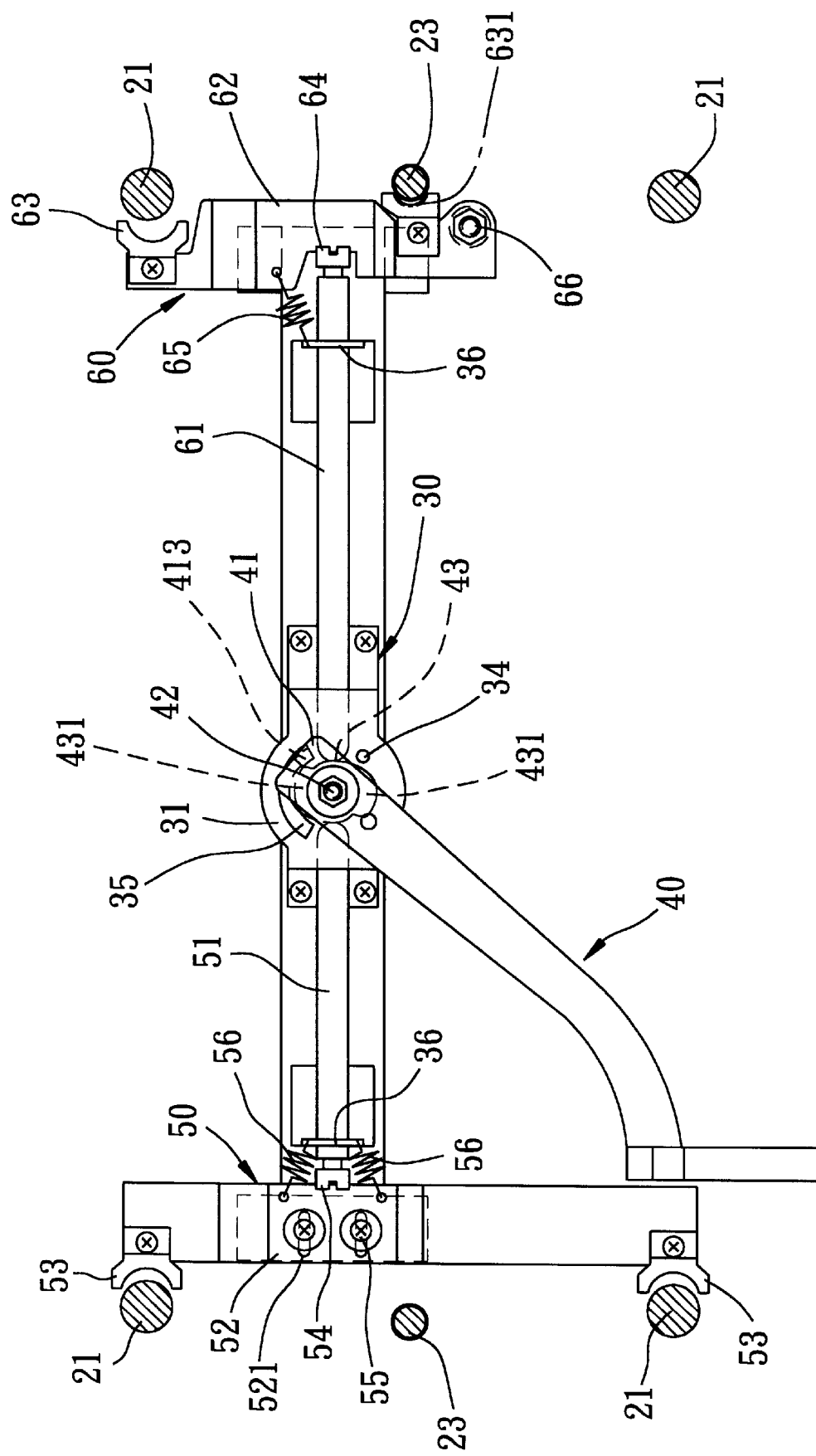
FIG. 7 is a schematic top view of the preferred embodiment, illustrating how the cutter carriage is unlocked relative to the left and right pairs.

The left biasing unit 56 biases the left clamping claws 53 to separate from the left pair of posts 21 when the left projection 431 of the cam member 43 is removed from the left locking unit 50, as shown in FIG. 7.

Figure 8:
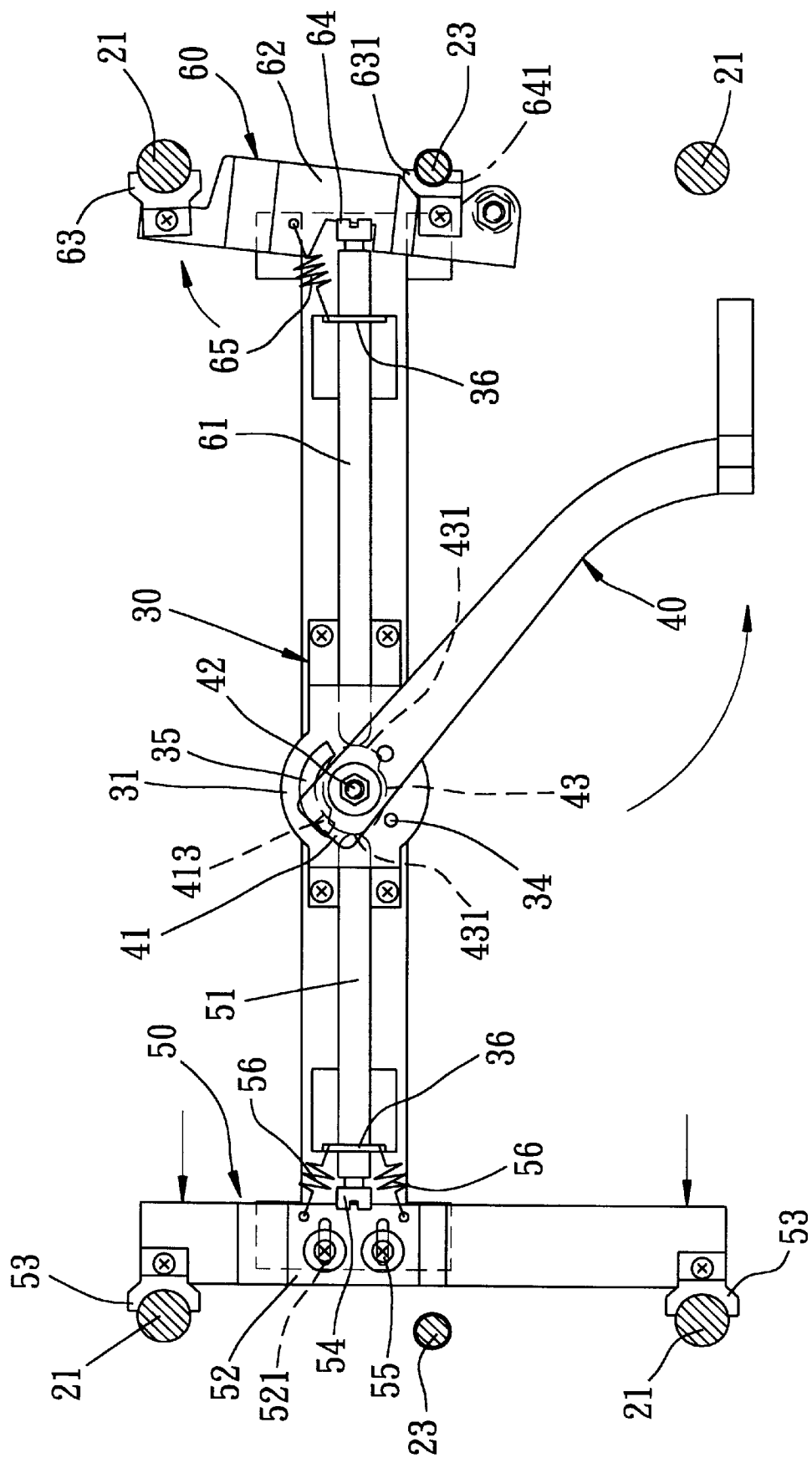
FIG. 8 is another schematic top view of the preferred embodiment, illustrating how the cutter carriage is locked relative to the left and right pairs of posts.

The right biasing unit 65 biases the right clamping claws 63 to separate from the right threaded rod 23 and one of the right pair of posts 21 when the right projection 431 of the cam member 43 is removed from the right locking unit 60, as shown in FIG. 7. A torsion spring 432 is fixed to the mounting plate 30 at one end, and to the cam member 43 at the other end so as to urge the cam member 43 to rotate in a direction, thereby biasing the rotary lever 40 to the locking position, as best shown in FIG. 8. Each of the left and right locking units 50,60 includes a horizontal follower rod 51,61 that extends in the longitudinal direction.

The mounting plate 30 includes vertical left and right rod-guiding plates 36 fixed respectively on two end portions thereof. Each of the left and right rod-guiding plates 36 is formed with a rod-extension hole 37 for extension of a respective one of the follower rods 51,61 therethrough. An inverted U-shaped cam-retaining seat 31 is fixed on the mounting plate 30 between the left and right rod-guiding plates 36, and has a horizontal top plate 310 (see FIG. 5), and vertical left and right side plates 311 that extend respectively, integrally and downwardly from two opposite sides of the top plate 310 and that are fixed on the mounting plate 30. The cam member 43 is disposed between the top plate 310 and the mounting plate 30 and between the left and right side plates 311. Each of the left and right side plates 311 is formed with a rod-extension hole 33 for extension of a respective one of the follower rods 51,61 therethrough. Each of the follower rods 51,61 has an inner end that contacts a respective one of the left and right projections 431 of the cam member 43.

The cam member 43 has a semicircular-cross-sectioned hole 430 (see FIG. 5) that is formed therethrough. Each of the top plate 310 of the cam-retaining seat 31 and the mounting plate 30 has a pin hole 32, 300 that is formed therethrough. The rotary lever 40 is located over the top plate 310 of the cam-retaining seat 31, and includes a counterbore 411 that is formed in the pivot end 41 and that has a semicircular-cross-sectioned lower portion and an enlarged upper portion, a nut 46 that is disposed within the enlarged upper portion of the counterbore 411 in the rotary lever 40, and a pivot pin 42 which has a semicircular-cross-sectioned portion that engages fittingly the semicircular-cross-sectioned lower portion of the counterbore 411 in the rotary lever 40 and the hole 430 in the cam member 43 and that extends through the pin holes 32, 300 in the top plate 310 of the cam-retaining seat 31 and the mounting plate 30, an externally threaded upper end that engages threadably the nut 46, and an enlarged lower end that is located under the mounting plate 30 so as to limit the rotary lever 40, the cam-retaining seat 31 and the cam member 43 between the nut 46 and the lower end of the pivot pin 42, thereby retaining the rotary lever 40 and the cam member 43 on the cam-retaining seat 31.

The top plate 310 of the cam-retaining seat 31 has a top surface that is formed with two positioning holes 34. The rotary lever 40 includes a spring-biased ball 44 that engages one of the positioning holes 34 in the top plate 310 when the rotary lever 40 is disposed at the locking position. The spring-biased ball 44 is moved to the other one of the positioning holes 34 in the top plate 310 when the rotary lever 40 rotates to the unlocking position.

Figure 6:
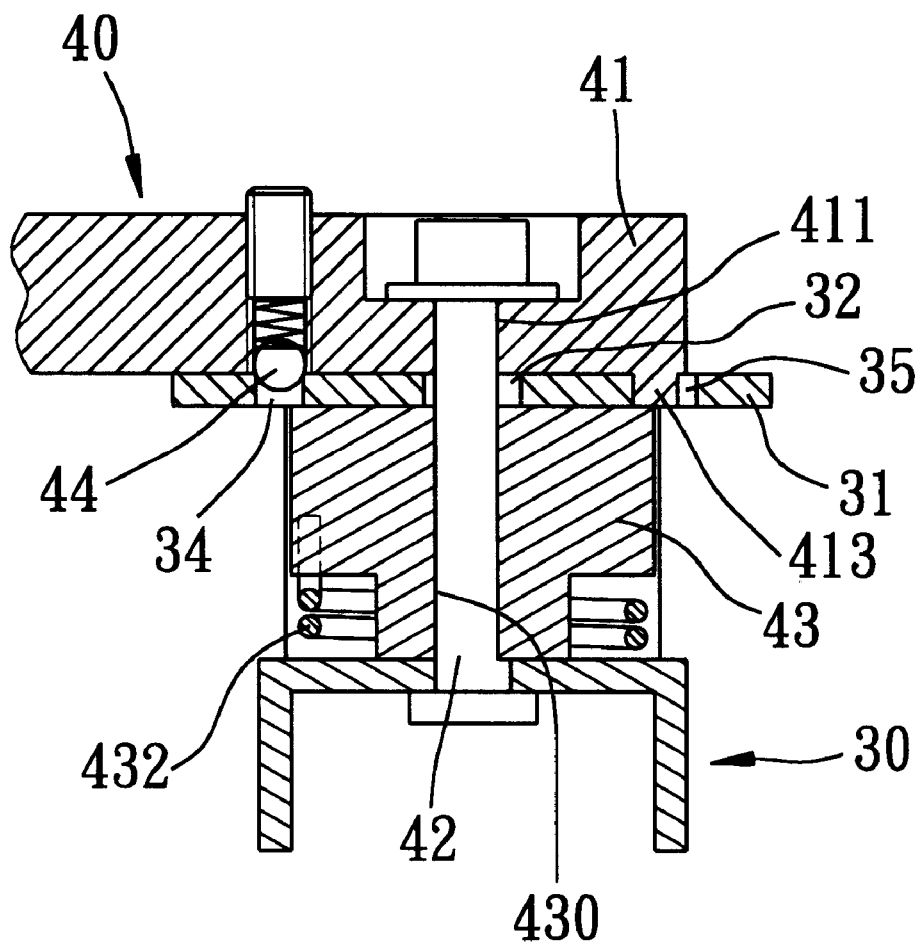
FIG. 6 is a fragmentary sectional view of the preferred embodiment, illustrating how a rotary lever is connected to a cam member.

The top plate 310 of the cam-retaining seat 31 is further formed with a curved restricting slot 35 that has two closed ends. The rotary lever 40 has a positioning element 413 that projects integrally and downwardly therefrom to engage slidably the restricting slot 35 in the top plate 310 (see FIG. 6) and that is located at one of the two ends of the restricting slot 35 when the rotary lever 40 is located in the locking position, and at the other one of the two ends of the restricting slot 35 when the rotary lever 40 is moved to the unlocking position.

The left locking unit 50 includes an elongated left embracing plate 52 which extends in the transverse direction and which is disposed slidably on the mounting plate 30, a guiding unit for guiding the left embracing plate 52 to move on the mounting plate 30 in the longitudinal direction, and a left adjustment screw 54. The left clamping claws 53 are mounted respectively and fixedly on two ends of the left embracing plate 52 and press respectively against the left pair of posts 21. The follower rod 51 of the left locking unit 50 has an internally threaded outer end 511. The left adjustment screw 54 engages threadably the internally threaded outer end 511 of the follower rod 51 of the left locking unit 50, and has an end surface that is formed with an open-ended slot 541 (see FIG. 5). The left embracing plate 52 is located between the left rod-guiding plate 36 and the left pair of posts 21, and has a middle portion 520 that engages fittingly the slot 541 in the left adjustment screw 54 so that the outer end 511 of the follower rod 51 of the left locking unit 50 presses against the left embracing plate 52, thereby pressing the left clamping claws 53 against the left pair of posts 21. The left biasing unit 56 is shaped as a tension spring that interconnects the left embracing plate 52 and the left rod-guiding plate 36 so as to bias the left embracing plate 52 toward the left rod-guiding plate 36, thereby retaining the left embracing plate 52 on the left adjustment screw 54.

The left embracing plate 52 further has a generally inverted U-shaped plate section which includes a horizontal plate portion 520 and two outwardly and downwardly inclined plate portions that are formed integrally on two opposite sides of the horizontal plate portion 520. The horizontal plate portion 520 is slightly wider than the mounting plate 30, and is formed with two slide slots 521 that extend in the longitudinal direction. The mounting plate 30 is formed with two threaded holes 301. The guiding unit includes a guiding block 38 that is fixed on the mounting plate 30 between the left rod-guiding plate 36 and the left pair of posts 21, and between the U-shaped plate section of the left embracing plate 52 and the mounting plate 30, and that is formed with two holes, and two bolts 55 that extend respectively through the slide slots 521 in the left embracing plate 52 and the holes in the guiding block 38 and that engage the threaded holes 301 in the mounting plate 30.

The follower rod 51 of the left locking unit 50 has an outer surface which is formed with a plurality of projecting blocks 512 that are adapted to facilitate rotation of the follower rod 51 of the left locking unit 50 relative to the left adjustment bolt 54 by using a clamping tool, which holds the follower rod 51 of the left locking unit 50 thereon.

The follower rod 61 of the right locking unit 60 has an internally threaded outer end 611. The right locking unit 60 includes an elongated right embracing plate 62 that is connected pivotally to the right clamping claws 63 at two end portions thereof, a vertical pivot bolt 66 that connects an end of the right embracing plate 62 rotatably to the mounting plate 30, and a right adjustment screw 64 which engages the internally threaded outer end 611 of the follower rod 61 of the right locking unit 60 and which has an end surface that is formed with an open-ended slot 641. The right embracing plate 62 is located between the right rod-guiding plate 36 and the right pair of posts 21, and has a middle portion 620 that engages fittingly the slot 641 in the right adjustment screw 64 of the right locking unit 60 so that the outer end 611 of the follower rod 61 of the right locking unit 60 presses against the right embracing plate 62, thereby pressing the right clamping claws 63 against the threaded rod 23 and one of the right pair of posts 21. The right biasing unit 65 is shaped as a tension spring that interconnects the right embracing plate 62 and the right rod-guiding plate 36 so as to bias the right embracing plate 62 to turn toward the right rod-guiding plate 36, thereby retaining the right embracing plate 62 on the right adjustment screw 64.

The follower rod 61 of the right locking unit 60 has an outer surface which is formed with a plurality of projecting blocks 612 that are adapted to facilitate rotation of the follower rod 61 of the right locking unit 60 relative to the right adjustment screw 64 by using a clamping tool, which holds the follower rod 61 of the right locking unit 60 thereon.

Preferably, one of the right clamping claws 63 disposed on the right embracing plate 62 is aligned with the right threaded rod 23, and has a horizontal-toothed surface 631 that engages the right threaded rod 23.

With this invention thus explained, it is apparent that numerous modifications and variations can be made without departing from the scope and spirit of this invention. It is therefore intended that this invention be limited only as indicated in the appended claims.

I claim:

1. A wood planing machine comprising:
   an elongated machine base having a top surface, opposed left and right mounting sides spaced apart from each other in a longitudinal direction, and opposed feed-in and take-out sides spaced apart from each other in a transverse direction;
   left and right pairs of posts fixed on said top surface of said machine base at said left and right mounting sides, respectively;

a cutter carriage disposed above said machine base, and having opposite end portions mounted respectively, vertically and movably on said left and right pairs of posts;

vertical left and right threaded rods mounted respectively and rotatably on said left and right mounting sides of said machine base such that said rods are disposed respectively between said left and right pairs of posts and extend threadedly through said opposite end portions of said cutter carriage for moving said cutter carriage along said posts when said threaded rods rotate on said machine base, thereby adjusting height of said cutter carriage; and a carriage locking mechanism for locking said cutter carriage at a selected height relative to said machine base, said carriage locking mechanism including an elongated mounting plate disposed fixedly on said cutter carriage and extending in said longitudinal direction, a left locking unit including a pair of left clamping claws that press respectively and releaseably against two of said left pair of posts and said left threaded rod, a right locking unit including a pair of right clamping claws that press respectively and releaseably against two of said right pair of posts and said right threaded rod, a cam member disposed pivotally on said mounting plate and rotatable about a vertical axis, said cam member having left and right projections that engage respectively said left and right locking units, a rotary lever having a pivot end mounted pivotally on said mounting plate and connected to said cam member so as to rotate synchronously with said cam member, said rotary lever being disposed at a locking position and being rotatable to an unlocking position so as to remove said left and right projections of said cam member from said left and right locking units, a left biasing unit for biasing said left clamping claws to separate from said two of said left pair of posts and said left threaded rod when said left projection of said cam member is removed from said left locking unit, and a right biasing unit for biasing said right clamping claws to separate from said two of said right pair of posts and said right threaded rod when said right projection of said cam member is removed from said right locking unit.

2. The wood planing machine as defined in claim 1, further comprising a torsion spring which interconnects said cam member and said mounting plate so as to urge said cam member to rotate in a direction, thereby biasing said rotary lever to said locking position.

3. The wood planing machine as defined in claim 1, where each of said left and right locking units includes a horizontal follower rod that extends in said longitudinal direction, said mounting plate including vertical left and right rod-guiding plates fixed respectively on two end portions of said mounting plate, each of said left and right rod-guiding plates being formed with a rod-extension hole for extension of a respective one of said follower rods therethrough, and an inverted U-shaped cam-retaining seat fixed on said mounting plate between said left and right rod-guiding plates and having a horizontal top plate, and vertical left and right side plates that extend, respectively, integrally and downwardly from two opposite sides of said top plate and that are fixed on said mounting plate, said cam member being disposed between said top plate and said mounting plate and between said left and right side plates, each of said left and right side plates being formed with a rod-extension hole for extension of a respective one of said follower rods therethrough, each of said follower rods having an inner end that contacts a respective one of said left and right projections of said cam member.

4. The wood planing machine as defined in claim 3, wherein said cam member having a semicircular-cross-sectioned hole that is formed therethrough, each of said top plate of said cam-retaining seat and said mounting plate has a pin hole that is formed therethrough, said rotary lever being located over said top plate of said cam-retaining seat and including a counterbore that is formed in said pivot end and that has a semicircular-cross-sectioned lower portion and an enlarged upper portion, a nut that is disposed within said enlarged upper portion of said counterbore in said rotary lever, and a pivot pin which has a semicircular-cross-sectioned portion that engages fittingly said semicircular-cross-sectioned lower portion of said counterbore in said rotary lever and said hole in said cam member and that extends through said pin holes in said top plate of said cam-retaining seat and said mounting plate, an externally threaded upper end that engages threadably said nut, and an enlarged lower end that is located under said mounting plate so as to limit said rotary lever, said cam-retaining seat and said cam member between said nut and said lower end of said pivot pin, thereby retaining said rotary lever and said cam member on said cam-retaining seat.

5. The wood planing machine as defined in claim 3, wherein said top plate of said cam-retaining seat has a top surface that is formed with two positioning holes, said rotary lever including a spring-biased ball that engages one of said positioning holes in said top plate when said rotary lever is disposed at said locking position, said spring-biased ball being moved to the other one of said positioning holes in said top plate when said rotary lever rotates to said unlocking position.

6. The wood planing machine as defined in claim 3, wherein said top plate of said cam-retaining seat is formed with a curved restricting slot that has two closed ends, said rotary lever having a positioning element that projects integrally and downwardly therefrom to engage slidably said restricting slot in said top plate and that is located at one of said two ends of said restricting slot when said rotary lever is located in said locking position and at the other one of said two ends of said restricting slot when said rotary lever is moved to said unlocking position.

7. The wood planing machine as defined in claim 3, wherein said left locking unit includes an elongated left embracing plate which extends in said transverse direction and which is disposed slidably on said mounting plate, a guiding unit for guiding said left embracing plate to move on said mounting plate in said longitudinal direction, and a left adjustment screw, said left clamping claws being mounted respectively and fixedly on two ends of said left embracing plate and pressing respectively against said left pair of said posts, said follower rod of said left locking unit having an internally threaded outer end, said left adjustment screw engaging threadably said internally outer end of said follower rod of said left locking unit, and having an end surface that is formed with an open-ended slot, said left embracing plate being located between said left rod-guiding plate and said left pair of said posts and having a middle portion that engages fittingly said slot in said left adjustment screw so that said outer end of said follower rod of said left locking unit presses against said left embracing plate, thereby pressing said left clamping claws against said left pair of said posts, said left biasing unit being shaped as a tension spring that interconnects said left embracing plate and said left rod-guiding plate so as to bias said left embracing plate toward said left rod-guiding plate, thereby retaining said left embracing plate on said left adjustment screw.

8. The wood planing machine as defined in claim 7, wherein said left embracing plate has a generally inverted U-shaped plate section which includes a horizontal plate portion and two outwardly and downwardly inclined plate portions that are formed integrally on two opposite sides of said horizontal plate portion, said horizontal plate portion being slightly wider than said mounting plate and being formed with two slide slots that extend in said longitudinal direction, said mounting plate being formed with two threaded holes, said guiding unit including a guiding block that is fixed on said mounting plate between said left rod-guiding plate and said left pair of said posts and between said U-shaped plate section of said left embracing plate and said mounting plate and that is formed with two holes, and two bolts that extend respectively through said slide slots in said left embracing plate and said holes in said guiding block and that engage said threaded holes in said mounting plate.

9. The wood planing machine as defined in claim 7, wherein said follower rod of said left locking unit has an outer surface which is formed with a plurality of projecting blocks that are adapted to facilitate rotation of said follower rod of said left locking unit relative to said left adjustment bolt by using a clamping tool, which holds said follower rod of said left locking unit thereon.

10. The wood planing machine as defined in claim 3, wherein said follower rod of said right locking unit has an internally threaded outer end, said right locking unit including an elongated right embracing plate that is connected pivotally to said right clamping claws at two end portions thereof, a vertical pivot bolt that connects an end of said right embracing plate rotatably to said mounting plate, and a right adjustment screw which engages said internally threaded outer end of said follower rod of said right locking unit and which has an end surface that is formed with an open-ended slot, said right embracing plate being located between said right rod-guiding plate and said right pair of said posts and having a middle portion that engages fittingly said slot in said right adjustment screw of said right locking unit so that said outer end of said follower rod of said right locking unit presses against said right embracing plate, thereby pressing said right clamping claws against said two of said right pair of said posts and said right threaded rod, said right biasing unit being shaped as a tension spring that interconnects said right embracing plate and said right rod-guiding plate so as to bias said right embracing plate to turn toward said right rod-guiding plate, thereby retaining said right embracing plate on said right adjustment screw.

11. The wood planing machine as defined in claim 10, wherein said follower rod of said right locking unit has an outer surface which is formed with a plurality of projecting blocks that are adapted to facilitate rotation of said follower rod of said right locking unit relative to said right adjustment screw by using a clamping tool, which holds said follower rod of said right locking unit thereon.

12. The wood planing machine as defined in claim 11, wherein one of said right clamping claws has a horizontal-toothed surface that engages said right threaded rod.

* * * * *